(12) United States Patent
Lu

(10) Patent No.: US 7,011,319 B2
(45) Date of Patent: Mar. 14, 2006

(54) FOLDING DEVICE OF A SCOOTER

(76) Inventor: Fa-Hsing Lu, 7F, No. 109, Sec. 3, Taijunggang Rd., Shituen Chiu, Taichung County 407 (TW)

( * ) Notice: Subject to any disclaimer, the term of this patent is extended or adjusted under 35 U.S.C. 154(b) by 83 days.

(21) Appl. No.: 10/839,961

(22) Filed: May 6, 2004

(65) Prior Publication Data
US 2005/0248111 A1    Nov. 10, 2005

(51) Int. Cl.
*B62M 1/00* (2006.01)
(52) U.S. Cl. .............................. 280/87.041; 280/87.05
(58) Field of Classification Search ............ 280/87.01, 280/87.021, 87.041, 87.042, 87.05; 403/83, 403/84, 91, 92, 94, 96
See application file for complete search history.

(56) References Cited

U.S. PATENT DOCUMENTS

| | | | |
|---|---|---|---|
| 6,179,307 B1 * | 1/2001 | Mao | 280/87.041 |
| 6,276,701 B1 * | 8/2001 | Chen | 280/87.05 |
| 6,332,621 B1 * | 12/2001 | Wu | 280/87.041 |
| 6,378,880 B1 * | 4/2002 | Lin | 280/87.05 |
| 6,390,483 B1 * | 5/2002 | Hsu et al. | 280/87.041 |
| 6,428,021 B1 * | 8/2002 | Tung | 280/87.041 |
| 6,481,913 B1 * | 11/2002 | Chen | 403/83 |
| 6,848,697 B1 * | 2/2005 | Lan | 280/87.05 |
| 6,883,814 B1 * | 4/2005 | Chuang | 280/87.041 |

\* cited by examiner

*Primary Examiner*—Christopher P. Ellis
*Assistant Examiner*—Brian Swenson
(74) *Attorney, Agent, or Firm*—Alan D. Kamrath; Nikolai & Mersereau, P.A.

(57) ABSTRACT

A folding device of a scooter includes a connector adapted to be secured on a front portion of a platform of the scooter. A housing is sleeved on the connector. A pivot seat is pivotally connected to the connector and selectively positioned to the connector. A cover is secured on the connector and the housing for closing the housing to prevent the user's finger being moved into the connector and clamped by the moving pivot seat during folding the scooter.

6 Claims, 5 Drawing Sheets

FOLDING DEVICE OF A SCOOTER

BACKGROUND OF THE INVENTION

1. Field of the Invention

The present invention relates to a folding device, and more particularly to a folding device of a scooter.

2. Description of Related Art

A conventional folding device of a scooter in accordance with the prior art shown in FIGS. 4 and 5 comprises connector (60) upwardly extending from a front portion of a platform (6) of the scooter and a pivot seat (610) extending from a lower portion of a stand (61) of the scooter.

The connector (60) and the pivot seat (610) are pivotally connected to each other. The connector (60) includes two plates (not numbered) parallel an axis of the platform (6) and corresponding to each other. Each plate of the connector (60) includes a curved side having two opposite ends each having an indentation (601) defined therein.

The pivot seat (610) is rotatable relative to the connector (60). The pivot seat (610) includes two side plates (not numbered) respectively slidably abutting a corresponding one of the two plates of the connector (60). A slot (611) is defined in each of the two side plates of the pivot seat (610). Each slot (611) corresponds to the curved side and the indentation (601) of each of the two plates of the connector (60). A locking pin (612) extends through the pivot seat (610) via the slots (611) defined therein and is selectively received in a corresponding one of the two indentations (601) of each of the two plates of the connector (60) to hold the pivot seat (610) in place relative to the connector (60). A knob (613) is movably mounted on the pivot seat (610) for selectively pulling the locking pin (612). Consequently, the pivot seat (610) is in a free condition when the locking pin (612) is outwardly pulled and disengaged from the indentation (601) of each of the two plate of the connector (60). As a result, the user can easily fold the scooter for being easily carried and stored.

However, the two plate of the connector (60) are separated from each other so that a passage is formed therebetween. It is dangerous when the user's fingers within the two plates of the connector (60) during folding the scooter.

The present invention has arisen to mitigate and/or obviate the disadvantages of the conventional folding device of a scooter.

SUMMARY OF THE INVENTION

The main objective of the present invention is to provide an improved folding device of a scooter, which can prevent the user's fingers from being clamped during folding the scooter.

To achieve the objective, the folding device of a scooter in accordance with the present invention comprises a connector adapted to be secured on a front portion of a platform of the scooter. A housing is sleeved on the connector. A pivot seat is pivotally connected to the connector and selectively positioned to the connector. A cover is secured on the connector and the housing for closing the housing to prevent the user's finger being moved into the connector and clamped by the moving pivot seat during folding the scooter.

Further benefits and advantages of the present invention will become apparent after a careful reading of the detailed description with appropriate reference to the accompanying drawings.

DETAILED DESCRIPTION OF THE INVENTION

Figure 1:
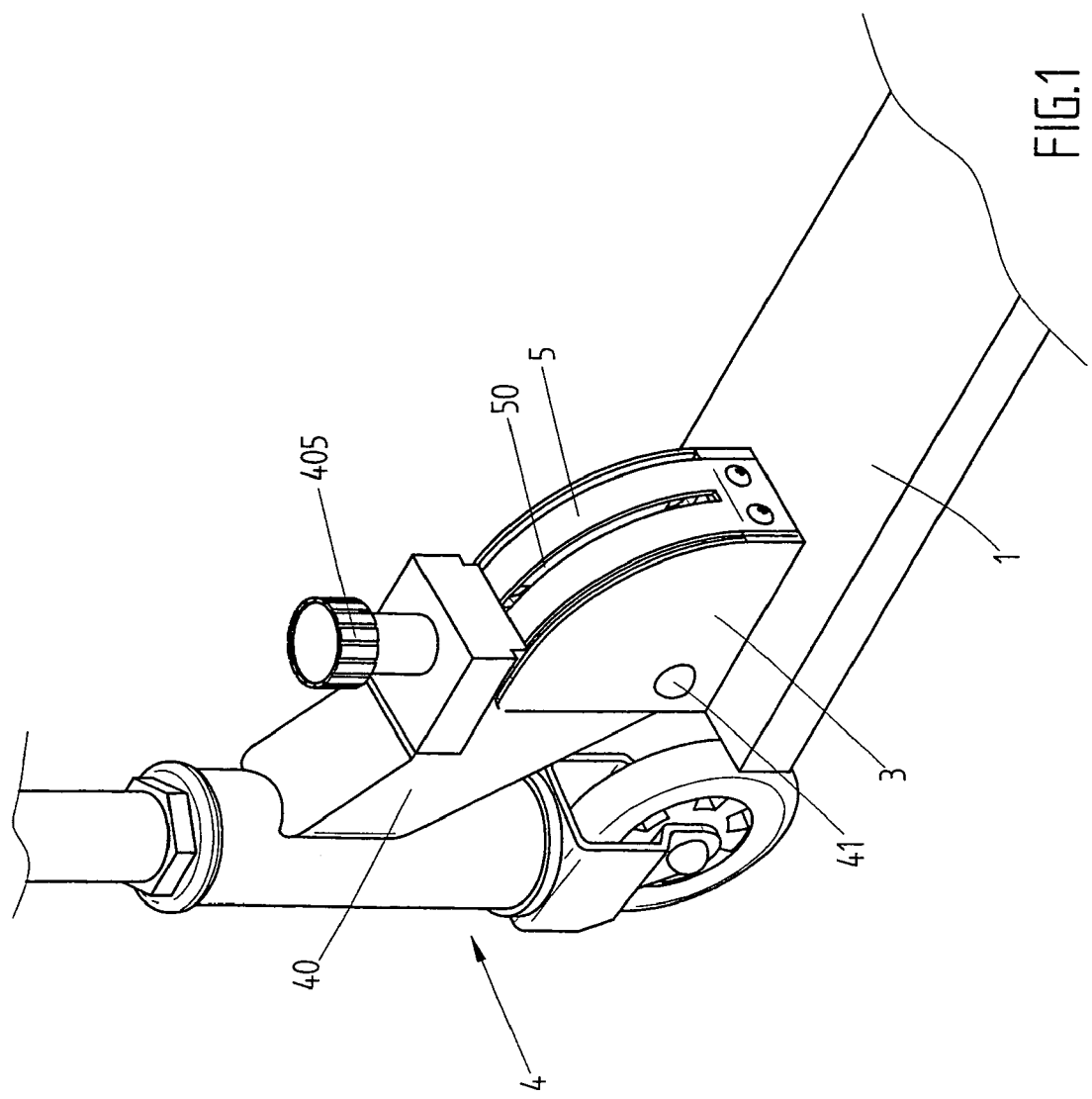
FIG. 1 is a perspective schematic view of a folding device of a scooter in accordance with the present invention.
Figure 2:
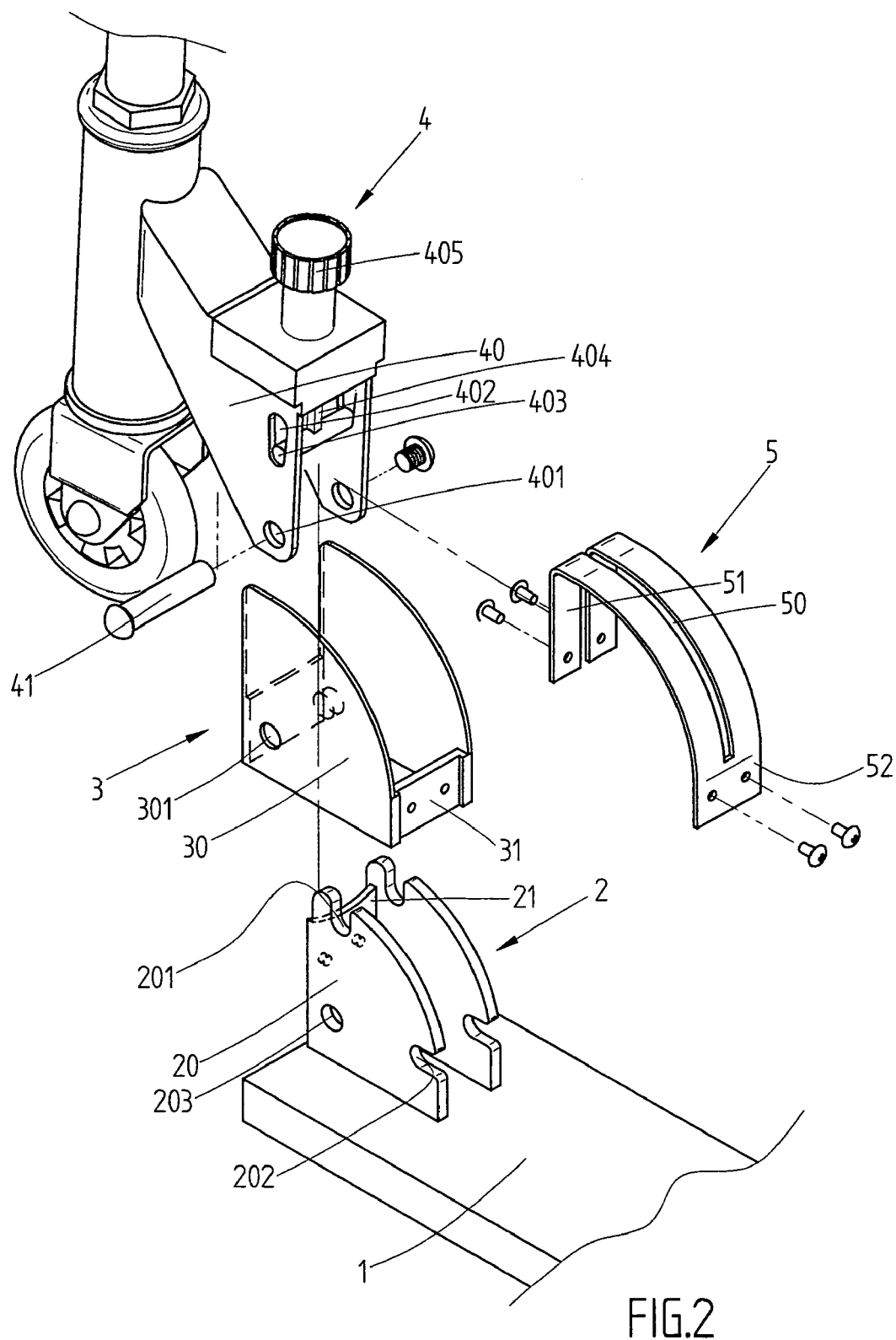
FIG. 2 is an exploded perspective view of the folding device in FIG. 1.

Referring to the drawings and initially to FIGS. 1 and 2, a folding device of a scooter in accordance with the present invention comprises connector (2) adapted secured on a front portion of a platform (1) of the scooter, a housing (3) sleeved on the connector (2), a pivot seat (40) pivotally mounted to the connector (2) and a cover (5) mounted to the housing (3) for closing the housing (3).

The connector (2) includes two side plates (20) upwardly extending from the platform (1) and parallel to each other. Each side plate (20) includes a curved edge formed thereon. A first indentation (201) is defined in a top portion of the curved edge of each of the two side plates (20) and a second indentation (202) is defined in a lower portion of the curved edge of each of the two side plates (20). A first through hole (203) is defined in each of the two side plates (20). Stopper (21) is mounted between the two side plates (20) and laterally connected to the two side plates (20).

The housing (3) includes two sidewalls (30) respectively parallel to a corresponding one of the two side plates (20) of the connector (2) and separated from each other. Each sidewall (30) has a shape corresponding to that of each of the two side plates (20) of the connector (2) and has an area greater than that of each of the two side plates (20) of the connector (1). A connecting plate (31) is secured on a lower portion of the housing (3) under the second indentations (202) when the housing (3) sleeved on the connector (2). A second through hole (301) is laterally defined in the housing (3) aligns with the first through hole (203) when the housing (3) sleeved on the connector (2).

The pivot seat (4) includes two side plates (40) each movably received between a corresponding one of the two side plates (20) of the connector (2) and a corresponding one of the two sidewalls (30) of the housing (3). A third through hole (401) is defined in each of the two side plates (40) and co-axially corresponds to each other. The third through hole (401) aligns with the first through hole (203) when the pivot seat (4) is pivotally mounted to the connector (2). A pivot (41) pivotally extends through the third through hole (401), the second through hole (301) and the first through hole (203) to pivotally connect the connector (2) the housing (3) and the pivot seat (4). Each side plate (40) includes a slot (402) defined therein and corresponding to each other. Each slot (102) selectively longitudinally corresponds to the first indentation (201) and the second indentation (202) in the connector (2). A locking pin (403) includes two opposite ends respectively received in a corresponding one of the two slots (402) in the two side plates (40) of the pivot seat (4) and selectively received in the two first indentations (201) an the two second indentations (202) in the connector (2) to hold the pivot seat (4) in place. A stub (404) is movably mounted in the pivot seat (4). The stub (404) has a first end secured on the locking pin (403) and a second end extending through the pivot seat (4). A knob (405) is mounted to the second end of the stub (404) for user to easily pull the locking pin (403) and make the locking pin (403) be disengaged from the first indentations (201)/second indentations (202) in the connector (2). Consequently, the user can easily fold/expand the scooter when the locking pin (403) is disengaged from the first indentations (201)/second indentation (202).

The cover (5) is mounted to housing (3) between the two side plates (40) of the pivot seat (4) for closing the housing (3). The cover (5) includes a guiding groove (50) longitudinally defined therein for the stub (404) to extend through the cover and moving within the guiding groove (50). The cover (50) includes a first end (51) secured on the stopper (21) of the connector (21) and a second end (52) secured on the connecting plate (31) of the housing (31) to hold the cover (5) in place.

Figure 3:
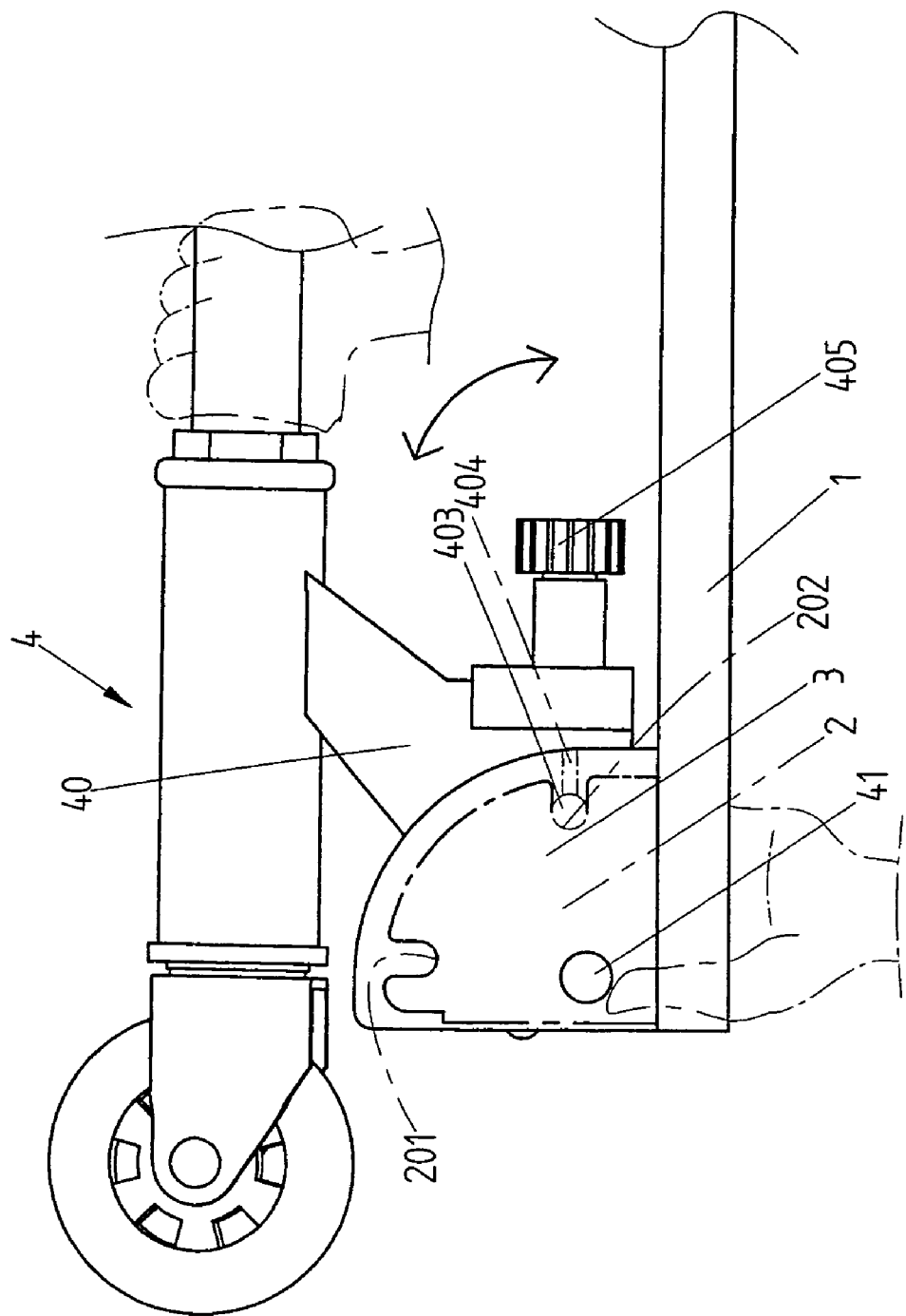
FIG. 3 is an operational side plan view of the folding device of a scooter in accordance with the present invention.
Figure 4:
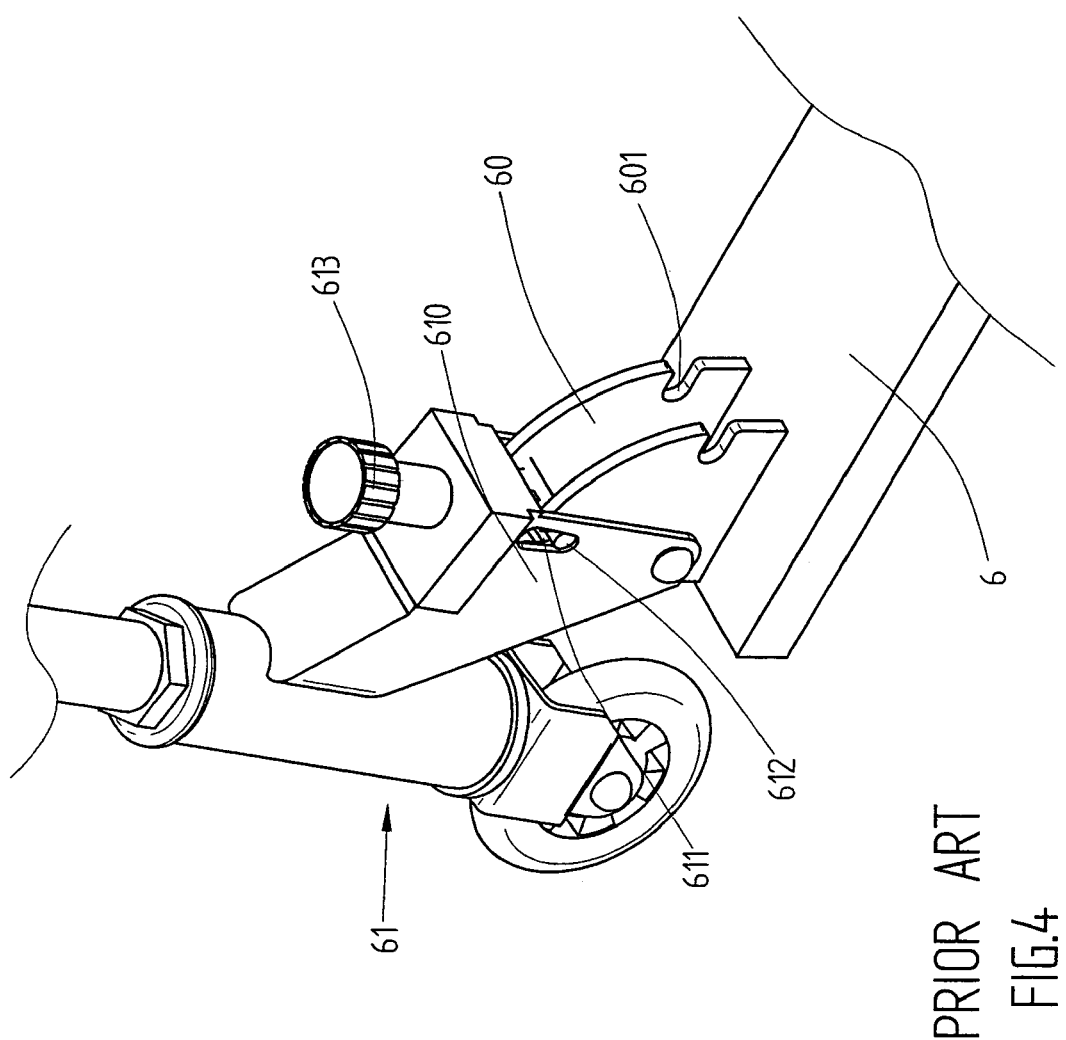
FIG. 4 is a perspective schematic view of a conventional folding device of a scooter in accordance with the prior art.
Figure 5:
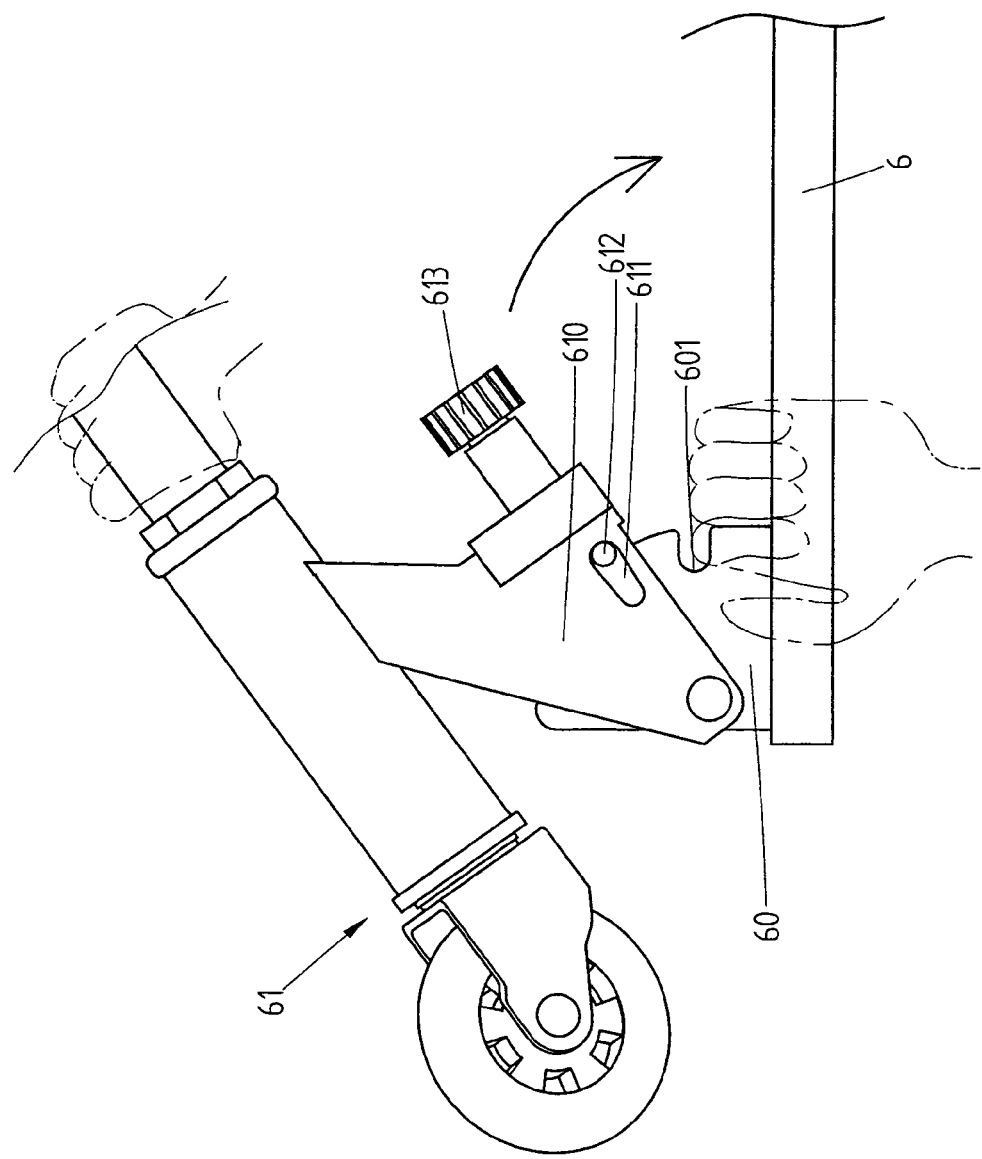
FIG. 5 is an operational side plan view of the conventional folding device of a scooter in FIG. 4.

With reference to FIG. 3, when folding the scooter, the knob (405) with the stub (404) is pulled to make the locking pin (403) disengage from the first indentations (201) in the connector (2). The stand is moved toward the platform (1) of the scooter. The locking pin (403) is automatically engaged to the second indentations (202) in the connector (2) to hold the pivot seat (4) in place due to a restitution force of a spring (not shown) that is mounted between the locking pin (403) and the pivot seat (4) when the locking pin (403) aligns with the second indentations (202) of the connector (2). The user holds the pivot seat (4) and the stand of the scooter when folding the scooter, and the cover (5) prevents the user's fingers moved into the connector (2). Consequently, the folding device of a scooter in accordance with the present invention promote the safety of a scooter because the folding device of the present invention prevents the user's fingers from being clamped due to the moving pivot seat (4) and the connector (2).

Although the invention has been explained in relation to its preferred embodiment, it is to be understood that many other possible modifications and variations can be made without departing from the spirit and scope of the invention as hereinafter claimed.

What is claimed is:

1. A folding device of a scooter, comprising:
   a connector adapted to be secured on a front portion of a platform of the scooter, the connector including two side plates each having a curved edge, a first indentation defined in a top portion of the curved edge of each of the side plate and a second indentation defined in a lower portion of the curved edge of each of the two side plates;
   a housing sleeved on the connector, the housing includes two sidewalls each parallel to and separated from a corresponding one of the two side plate of the connector, each sidewall having a shape corresponding to that of each of the two side plates of the connector and a area greater than that of each of the two side plates of the connector;
   a pivot seat pivotally connected to the connector, the pivot seat including two side plates each movably received between a corresponding one of the two side plates of the connector and a corresponding one of the two sidewalls of the housing, each side plate of the pivot seat has a slot defined therein, the slot in each side plate of the pivot seat communicating with the first indentation in each of the two side plates of the connector when the scooter is in a condition for operation and communicating with the second indentation in each of the two side plates of the connector when the scooter after being folded for holding the pivot seat in place, a locking pin having two opposite ends respectively received in and reciprocally moved in the slot in the two side plates of the pivot seat, the locking pin partially received in the two indentations in connector when the scooter is in a condition for operation and partially received in the two second indentations when the scooter after being folded; and
   a cover secured on the connector and the housing for closing the housing to prevent the user's fingers from being moved into the connector during folding the scooter.

2. The folding device as claimed in claim 1, wherein the connector includes a stopper mounted between the two side plates of the connector and laterally connected to the two side plates of the connector, the housing includes a connecting plate secured on a lower portion of the housing under the second indentations in the connector when the housing sleeved on the connector, and the cover includes a first end secured on the stopper of the connector and a second end secured on the connecting plate of the housing.

3. The folding device as claimed in claim 1, wherein the pivot seat includes a stub having a first end secured on the locking pin, and a second extending through the pivot seat and having a knob mounted on the second end of the stub for user to easily drive the locking pin.

4. The folding device as claimed in claim 2, wherein the pivot seat includes a stub having a first end secured on the locking pin, and a second extending through the pivot seat and having a knob mounted on the second end of the stub for user to easily drive the locking pin.

5. The folding device as claimed in claim 3, wherein the cover includes a guiding groove longitudinally defined therein to allow the stub extend through the cover.

6. The folding device as claimed in claim 4, wherein the cover includes a guiding groove longitudinally defined therein to allow the stub extend through the cover.

* * * * *